United States Patent
MacMullan et al.

(10) Patent No.: US 9,647,719 B2
(45) Date of Patent: May 9, 2017

(54) METHOD, SYSTEM, AND APPARATUS FOR SPECTRUM SENSING OF RADAR SIGNALS

(71) Applicant: FEDERATED WIRELESS, INC., Arlington, VA (US)

(72) Inventors: Samuel Jay MacMullan, Carlisle, MA (US); Etty Lee, Winchester, MA (US); Jeff Winston, Sudbury, MA (US); Rohan Grover, Medford, MA (US); Kurt Schaubach, Arlington, VA (US)

(73) Assignee: Federated Wireless, Inc., Arlington, VA (US)

( * ) Notice: Subject to any disclaimer, the term of this patent is extended or adjusted under 35 U.S.C. 154(b) by 0 days.

(21) Appl. No.: 15/043,848

(22) Filed: Feb. 15, 2016

(65) Prior Publication Data
US 2016/0241275 A1     Aug. 18, 2016

Related U.S. Application Data

(60) Provisional application No. 62/116,804, filed on Feb. 16, 2015.

(51) Int. Cl.
*H04B 1/69*     (2011.01)
*H04B 1/10*     (2006.01)

(52) U.S. Cl.
CPC .............. *H04B 1/69* (2013.01); *H04B 1/1027* (2013.01); *H04B 2001/6912* (2013.01)

(58) Field of Classification Search
CPC .............. H04L 27/2662; H04L 25/0202; H04L 27/2655; H04L 27/2663; H04L 27/2634;
(Continued)

(56) References Cited

U.S. PATENT DOCUMENTS 5,799,005 A * 8/1998 Soliman .............. H04W 24/00
                                                                370/335
6,058,101 A * 5/2000 Huang ................ H04L 27/2656
                                                                370/208
(Continued)

OTHER PUBLICATIONS

Rabiner, L., et al., "ARSR-4 Air Route Surveillance Radar", Theory and application of digital signal processing, Prentice-Hall (1975). Retrieved from http://fas.org/nuke/guide/usa/airdef/arsr-4.htm.

*Primary Examiner* — Emmanuel Bayard
(74) *Attorney, Agent, or Firm* — Finnegan, Henderson, Farabow, Garrett & Dunner LLP (57) ABSTRACT

An improved technique for detecting the presence or absence of one or more predetermined signals in a shared spectrum. In accordance with the disclosed embodiments, a received RF signal may be down-converted to a baseband signal, which is subsequently processed by a spectrum sensor to detect the presence or absence of a predetermined signal, such as a predetermined radar signal. The spectrum sensor may transform the baseband signal to the frequency domain, for example using a fast Fourier transform, to generate a corresponding set of frequency components. The spectrum sensor multiplies the frequency components of the baseband signal with the frequency response of a matched filter having a set of coefficients corresponding to the predetermined signal. The spectrum sensor may convert the matched-filter output signal to the time domain, for example using an inverse fast Fourier transform, and then may determine a value indicative of the signal power that it compares with a known threshold value. The spectrum sensor may determine the presence or absence of the predetermined signal in the received RF signal based on the result of the comparison, and may use the results of its determination to cause the reconfiguration of a transmitter
(Continued)

that may be used to transmit RF signals in the same shared spectrum as the received RF signal.

26 Claims, 6 Drawing Sheets

(58) Field of Classification Search
CPC ..... H04L 27/2692; H04L 7/042; H04B 1/005; H04B 1/123; H04B 7/0643; H04B 1/69
USPC .................................. 375/142, 150, 152, 343
See application file for complete search history.

(56) References Cited

U.S. PATENT DOCUMENTS

| | | | | |
|---|---|---|---|---|
| 6,483,617 B1* | 11/2002 | Roberts | ................ | H04B 10/077 398/29 |
| 6,920,194 B2* | 7/2005 | Stopler | ................ | H04L 25/067 375/349 |
| 6,975,673 B1* | 12/2005 | Rouquette | ........... | H04B 1/7102 375/145 |
| 7,197,243 B1* | 3/2007 | Harley | ................ | H04B 10/077 398/193 |
| 7,212,569 B1* | 5/2007 | Clark | .................... | H04L 25/022 375/233 |
| 7,231,095 B2* | 6/2007 | Tanaka | ................ | G01S 7/4802 375/149 |
| 7,280,071 B2* | 10/2007 | Awata | .................... | G01S 19/28 342/357.35 |
| 7,301,377 B2* | 11/2007 | Tanaka | .................... | H03J 1/005 327/113 |
| 7,321,728 B2* | 1/2008 | Harley | ................ | H04B 10/077 398/193 |
| 7,418,035 B1* | 8/2008 | Clark | .................... | H04L 25/022 375/233 |
| 7,460,876 B2* | 12/2008 | Sadri | .................... | H04W 52/42 370/203 |
| 7,471,652 B2* | 12/2008 | Bernard | ............. | G01R 13/0254 370/310 |
| 7,701,841 B2* | 4/2010 | Kawauchi | ........... | H04L 25/0232 370/208 |
| 7,720,162 B2* | 5/2010 | Krishnamoorthi | .... | G06F 17/142 370/210 |
| 7,826,343 B2* | 11/2010 | Krasner | .................... | G01S 1/04 370/203 |
| 7,907,679 B2* | 3/2011 | Kleider | ............... | H04L 25/4902 375/316 |
| 8,005,315 B2* | 8/2011 | Tanaka | ................ | G01S 7/4802 375/324 |
| 8,139,680 B2* | 3/2012 | Kleider | ................ | H04B 1/7073 375/242 |
| 8,229,460 B2* | 7/2012 | Tanaka | .................... | H03J 1/005 342/357.2 |
| 8,238,410 B2* | 8/2012 | Lennen | .................... | H04B 1/71 375/144 |
| 8,258,923 B2* | 9/2012 | Schulman | ............... | B60R 25/00 340/10.1 |
| 8,290,462 B2* | 10/2012 | Azadet | ................. | H04L 1/0631 375/350 |
| 8,369,386 B2* | 2/2013 | Takahashi | ............... | G01S 19/30 327/141 |
| 8,390,445 B2* | 3/2013 | Betts | .................. | G08B 13/1427 340/539.11 |
| 8,428,108 B2* | 4/2013 | Tanaka | ................. | H04B 1/7075 370/320 |
| 8,621,355 B2* | 12/2013 | Eppolito | ............ | G11B 27/034 715/203 |
| 8,649,416 B2* | 2/2014 | Tanaka | ................. | H04B 1/7075 370/441 |
| 8,660,509 B2* | 2/2014 | Watanabe | ............ | H03G 3/3078 455/238.1 |
| 8,692,713 B2* | 4/2014 | Tanaka | .................... | G01S 19/34 342/357.74 |
| 8,811,927 B2* | 8/2014 | Azadet | ................. | H04L 1/0631 375/350 |
| 8,831,121 B1* | 9/2014 | Qi | ....................... | H04L 27/2653 375/260 |
| 8,842,735 B2* | 9/2014 | Robertson | ........ | H04N 19/00636 375/240.16 |
| 8,842,842 B2* | 9/2014 | Eppolito | ................ | H04S 3/008 381/19 |
| 9,172,423 B1* | 10/2015 | Malocha | ............. | H04B 1/707 |
| 9,179,478 B2* | 11/2015 | Baldemair | .......... | H04J 13/0003 |
| 9,194,947 B1* | 11/2015 | Mohamed | ............ | G01S 13/582 |
| 9,351,266 B2* | 5/2016 | Sihlbom | ................. | H04W 56/00 |
| 2005/0128937 A1* | 6/2005 | Akopian | ................. | G01S 19/29 370/210 |
| 2006/0215779 A1* | 9/2006 | Shiina | ................. | H04L 27/2665 375/260 |
| 2006/0222056 A1* | 10/2006 | Yotsumoto | ........... | H04B 1/7073 375/149 |
| 2007/0291696 A1* | 12/2007 | Zhang | .................... | H04L 5/023 370/331 |
| 2011/0200058 A1* | 8/2011 | Mushkin | ................ | H04L 5/0046 370/475 |
| 2011/0273334 A1* | 11/2011 | Karr | ....................... | G01S 13/825 342/378 |
| 2013/0093621 A1* | 4/2013 | Tanaka | .................... | G01S 19/30 342/357.68 |
| 2013/0114646 A1* | 5/2013 | Nitta | ...................... | G01S 19/30 375/147 |
| 2013/0188578 A1* | 7/2013 | Touboul | ................ | H04W 72/04 370/329 |
| 2015/0124734 A1* | 5/2015 | Olsson | ................ | H04W 74/002 370/329 |
| 2015/0365975 A1* | 12/2015 | Sahlin | ................. | H04L 27/2613 370/252 |
| 2016/0094895 A1* | 3/2016 | Stadelmeier | ........... | H04H 20/59 725/33 |
| 2016/0112214 A1* | 4/2016 | Currivan | ................. | H04B 3/46 375/222 |

\* cited by examiner

METHOD, SYSTEM, AND APPARATUS FOR SPECTRUM SENSING OF RADAR SIGNALS

CROSS-REFERENCE TO RELATED APPLICATIONS

This application claims the benefit of U.S. Provisional Application Ser. No. 62/116,804, filed Feb. 15, 2015, which is hereby incorporated by reference in its entirety.

Portions of the present invention were made under Contract W15P7T-11-C-A806 awarded by the U.S. Army and the government may have certain rights in the invention.

FIELD OF INVENTION

The present invention relates to spectrum sensing and, more particularly, to methods, systems, and apparatuses for sensing the presence or absence of certain signals in a shared spectrum.

BACKGROUND

The radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party gets one or more frequency assignments, in the form of a license, to operate a radio transmitter on specific frequencies within a particular geographic location.

The system of spectrum allocation, allotment, and assignment is failing to keep pace with the increasing demand for spectrum. There is therefore a need to improve how the available spectrum can be efficiently allocated, allotted, and assigned in the face of growing demand. Unless otherwise noted, "allocation" is used in the present disclosure to generally refer to the process by which spectrum is allocated, allotted, and assigned to licensed users.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz band recently made available for commercial use in the United States. In another example, a DSA system may be used to share access to unlicensed spectrum, such as TV Whitespace. Coordinating and managing multi-user access to a shared spectrum presents challenges in a DSA system.

Spectrum sensing may be used to enable efficient use of a shared spectrum. A spectrum sensor in a DSA system may monitor a frequency channel in the shared spectrum to determine if that channel is being used by other users. For example, information obtained from a spectrum sensor may enable a user of a DSA system to identify if the frequency channel is not currently being used or is being used by users having higher-priority access permissions, such as military users.

Spectrum sensing typically involves detecting the amount of energy or power (i.e., energy per unit time) received in a frequency channel, for example using a radiometer designed for that frequency. This spectrum sensing technique, however, requires knowledge of the noise and interference characteristics of the frequency channel and typically cannot detect signals having low signal-to-noise ratios (SNR). In the increasingly congested wireless environment, these limitations of spectrum sensors can be prohibitive because the received signals may have low SNR and the noise and interference environment is highly variable.

Figure 1:
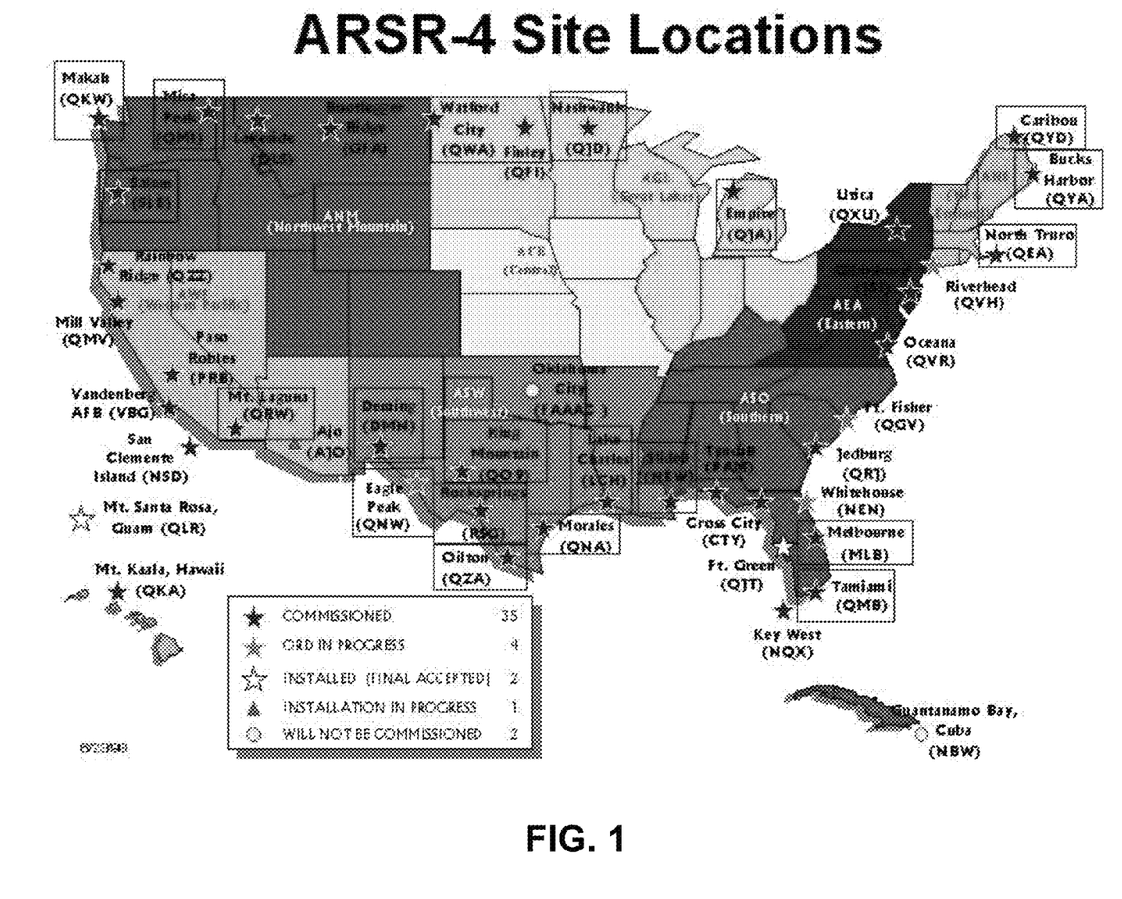
FIG. 1 is a map of the United States showing the locations of ARSR-4 radar systems.

Air Route Surveillance Radar Model 4 (ARSR-4) and Ship Air Surveillance Radar AN/SPN-43 are examples of radar systems that are currently being used by the U.S. government in the L-band and the 3.5 GHz band, respectively. Other radar systems may operate in frequency bands, for example, adjacent to the 3.5 GHz band. ARSR-4, for example, is a frequency-modulated continuous-wave radar system located on the United States' borders and coastlines as illustrated in FIG. 1. The ARSR-4 radar system transmits signal pulses, where each pulse consists of two complex linear chirps at different center frequencies. The rise and fall times and signal shape of an ARSR-4 pulse may be approximated by a raised cosine function. Each linear chirp within an ARSR-4 pulse is itself a signal having a frequency that increases linearly as a function of time.

Spectrum sensing of incumbent signals, such as ARSR-4 and AN/SPN-43 radar signals and other terrestrial and satellite signals, is of particular interest in DSA systems used to manage spectrum usage in a shared spectrum, since the incumbent signals are typically afforded a higher-priority access to the shared spectrum. Accordingly, the DSA system must be aware of the presence of these higher-priority signals to avoid interference with them. For example, the DSA system may employ a SAS that has the capability of sensing users' spectrum usage. The SAS may ensure protection of incumbent signals by managing the assignment and re-assignment of frequency channels to users under the system's management based on the sensing results.

SUMMARY

The invention provides an improved technique for detecting the presence or absence of one or more predetermined signals in a shared spectrum. A spectrum sensor in the disclosed embodiments can detect the presence or absence of RF signals having lower signal-to-noise ratios than could be detected using previous power-sensing techniques. The spectrum sensor in the disclosed embodiments uses a matched filter that is configured to generate an output that can be used to detect one or more characteristics of a predetermined signal, such as at least one of the complex linear chirps in a conventional ARSR-4 radar signal. The disclosed spectrum sensor performs matched filtering in the frequency domain before making a determination in the time domain regarding the presence or absence of the predetermined signal, thereby avoiding a large amount of computations associated with applying the matched filter in the time domain.

In accordance with the disclosed embodiments of the invention, a received RF signal may be down-converted to a baseband signal, which is subsequently processed by the spectrum sensor to detect the presence or absence of a predetermined signal, such as a known chirp signal in an ARSR-4 pulse. The spectrum sensor may transform the baseband signal to the frequency domain, for example using a fast Fourier transform, to generate a corresponding set of frequency components. The spectrum sensor multiplies the frequency components of the baseband signal with the frequency response of a matched filter having a set of coefficients corresponding to the predetermined signal or an approximated version of the predetermined signal. The spectrum sensor may convert the matched-filter output signal to the time domain, for example using an inverse fast Fourier transform, and then may determine a signal power of the matched-filter output signal, or a value indicative of the signal power, that it compares with a known threshold value. The spectrum sensor may determine the presence or absence of the predetermined signal in the received RF signal based on the result of the comparison.

Advantageously, the spectrum sensor in the disclosed embodiments uses the results of its determination regarding the presence or absence of the predetermined signal to cause the reconfiguration of a transmitter that may be used to transmit RF signals in the same shared spectrum as the received RF signal. The transmitter may be reconfigured by determining a set of parameters for the transmitter to use, such as for example carrier frequency, modulation, power, transmission times, and/or operational modes. In some embodiments, the spectrum sensor itself may reconfigure the transmitter, and in other embodiments the sensor may cooperate with other components, such as a Spectrum Access System, to cause the transmitter to be reconfigured. According to one disclosed embodiment, the transmitter may be reconfigured to transmit in at least one frequency channel other than the frequency channel of the predetermined signal when the spectrum sensor determines the predetermined signal is present in the received RF signal. In another disclosed embodiment, the transmitter may be reconfigured to transmit in the same frequency channel as the predetermined signal when the predetermined signal is determined to be present, but at a power level that avoids an unacceptable level of inter-signal interference. The transmitter also may be reconfigured to transmit in a frequency channel of the predetermined signal when the spectrum sensor determines that the predetermined signal is not present in the received RF signal.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF DISCLOSED EMBODIMENTS

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 2:
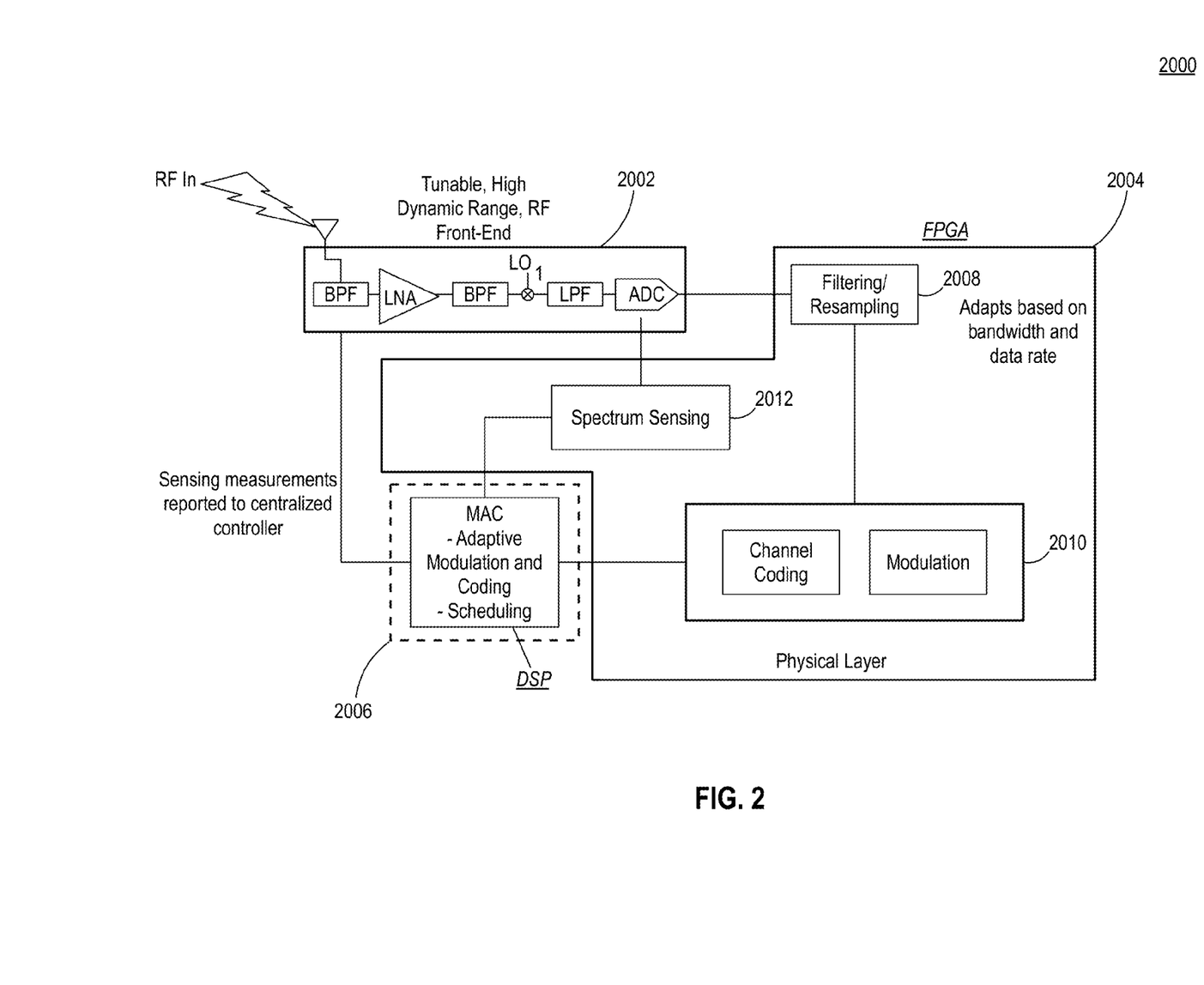
FIG. 2 is a schematic block diagram of an exemplary spectrum sensing solution in accordance with the disclosed embodiments.

FIG. 2 illustrates a schematic block diagram of an exemplary communication system 2000 including, among other things, a RF front end 2002, physical layer processing unit 2004, and a medium control access (MAC) processing unit 2006 that may be used in accordance with the disclosed embodiments. The communication system 2000 may be implemented in a device, such as a smartphone or laptop, as part of a larger computer system, or in any other system or apparatus that is capable of performing spectrum sensing as described herein. A person of ordinary skill will appreciate that the communication system 2000 also may include other hardware and software components, including for example a transmitter, a processor, and a memory, which are not shown in FIG. 2.

The RF front end 2002 in this exemplary embodiment may include at least an antenna configured to receive a RF signal, a low noise amplifier (LNA), bandpass filter (BPF), local oscillator (LO), a mixer, low-pass filter (LPF), and analog-to-digital converter (ADC). In operation, the front end 2002 may receive a RF signal at the antenna, such as in the 3.5 GHz band, then amplify, filter, and combine the amplified and filtered signal with the LO in the mixer to generate a complex baseband signal having in-phase (I) and quadrature (Q) signal components. The I and Q signal components are digitized in the ADC for further processing in the physical layer processing unit 2004.

In the exemplary embodiment shown in FIG. 2, the physical layer processing unit 2004 is implemented in a field-programmable gate array (FPGA). The physical layer processing unit 2004 alternatively may be implemented using, for example, one or more application specific integrated circuits (ASICs), digital signal processors (DSPs), graphics processing units (GPUs), and central processing units (CPUs). Similarly, the exemplary MAC processing unit 2006 is shown as being implemented in a DSP, whereas other embodiments may implement the MAC processing unit 2006 differently, for example, in one or more ASICs, CPUs, GPUs, and FPGAs. In alternative embodiments, the physical layer and MAC processing units may be implemented in the same processing unit, such as a FPGA, ASIC, CPU, GPU, or DSP.

The physical layer processing unit 2004 in this exemplary embodiment includes, among other things, a filtering and resampling unit 2008, a channel coding and modulation unit 2010, and a spectrum sensing unit 2012. MAC processing unit 2006 may be configured to adaptively control the channel coding rates and modulation schemes implemented in the channel coding and modulation unit 2010. As part of the adaptive coding and modulation processing, the filtering and resampling unit 2008 may resample and filter the digitized baseband signal, for example, based on signal bandwidth and data rate, to avoid aliasing and improve SNR. The MAC processing unit 2006 also may include additional functionalities such as, but not limited to, scheduling RF transmissions and reporting sensing measurements to a centralized controller in a DSA system using a transmitter (not shown) in the RF front end.

The spectrum sensing unit 2012 may comprise the spectrum sensor in accordance with the disclosed embodiments of the invention. In alternative embodiments, the spectrum sensor may be implemented outside of the physical layer processing unit 2004, for example in a stand-alone spectrum sensing unit 2012 having a processor for its spectrum-sensing functions. The spectrum sensor 2012 may be configured to detect the presence or absence of one or more predetermined signals in the baseband signal and generate a detection result that it may forward to the MAC processing unit 2006 for further processing.

In some embodiments of the invention, the MAC processing unit 2006 may reconfigure a transmitter, for example in the RF front end 2002, to transmit and/or receive signals at a different frequencies based on the sensing result from the spectrum sensing unit 2012. For example, when the spectrum sensor does not detect the presence of an ARSR-4 radar signal or other high-priority radar signal in a received RF signal over a shared spectrum, the MAC processing unit 2006 may control the communication system 2000 to begin transmitting and receiving RF signals using frequency channels in the shared spectrum. Alternatively, when the spectrum sensor detects the presence of a high-priority radar signal in the shared spectrum, the MAC processing unit 2006 may reconfigure one or more transmission parameters, such as but not limited to carrier frequency, modulation, transmission times, transmission power, and/or transmission modes, such that either (i) the communication system transmits over the shared spectrum in a way that does not interfere with the detected higher-priority radar signal, or (ii) the communication system transmits in at least one frequency channel other than a frequency channel of the detected higher-priority radar signal.

In the embodiment shown in FIG. 2, the communication system 2000 may include any devices/systems/apparatuses having a transmitter that the MAC processing unit 2006 may reconfigure based on a result from the spectrum sensing unit 2012. In an example, the communication system may be a part of a DSA system. In such an example, the MAC processing unit 2006 may control the reconfiguration of RF transmissions by one or more communication systems and/or devices that are part of the DSA system. To that end, the MAC processing unit 2006 may reconfigure, for example, communication times, frequencies, modes, and/or powers used by at least one transmitter coupled to the MAC processing unit and/or the spectrum sensing unit 2012. In alternative embodiments, the spectrum sensing unit 2012 may be configured to directly interface and reconfigure a transmitter in the same manner described above for the MAC processing unit 2006. In either case, the result of detecting the presence or absence of a predetermined signal in the spectrum sensor may cause reconfiguration of a transmitter in the communication system 2000.

Figure 3:
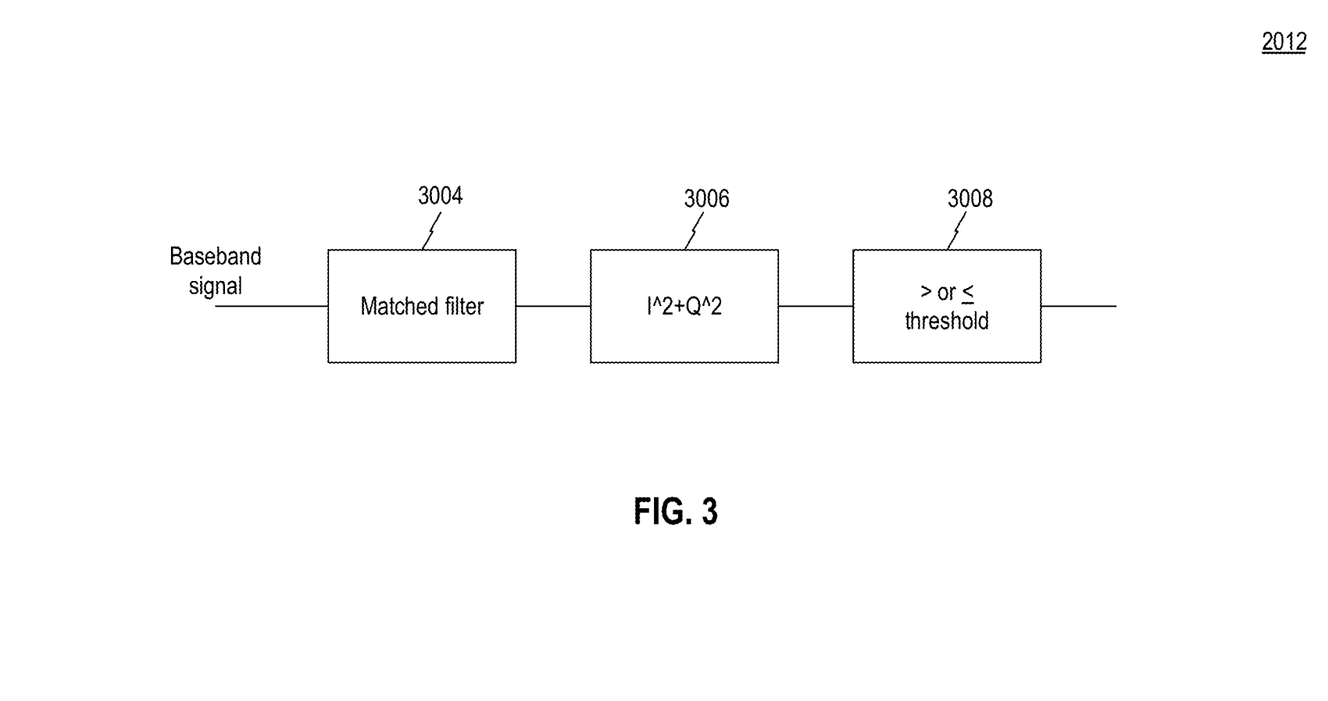
FIG. 3 is a schematic block diagram of an exemplary spectrum sensor that may be used in accordance with the disclosed embodiments.

FIG. 3 illustrates a schematic block diagram of an exemplary spectrum sensor that may be implemented in the spectrum sensing unit 2012 in accordance with the disclosed embodiments. For purposes of description, the spectrum sensor in the spectrum sensing unit 2012 will be referenced as spectrum sensor 2012. As shown in FIG. 3, spectrum sensor 2012 includes at least a matched filter 3004, power-determining unit 3006, and comparison unit 3008. The spectrum sensor may implement each of the matched filter, power-determining unit, and comparison unit using the same or different logic and processing circuitry, such as using a single processor or different functional logic units.

The matched filter 3004 is a filter that correlates a received signal with a predetermined signal, and the output of the matched filter may be used to detect the presence or absence of the predetermined signal in the received signal. As used herein, the "predetermined signal" refers to any known signal or any portion(s) of a known signal. The "impulse response" of a filter refers to the time-domain output signal that is generated by the filter in response to an impulse signal at its input. The "frequency response" of the filter is the result of transforming the filter's impulse response into the frequency domain. A "matched filter" is a finite impulse response (FIR) filter that may be completely characterized by either an impulse response or frequency response designed to correspond to certain characteristics of a predetermined signal. The matched filter's impulse response or frequency response may be represented as a set of coefficients (in the time or frequency domains, respectively), such that the output signal from the matched filter provides a relatively large SNR when the predetermined signal is input to the filter. For example, the coefficients of the matched filter 3004 may be determined based on characteristics of a complex linear chirp signal in an ARSR-4 radar signal, such as the chirp signal's center frequency and/or rise and fall times. In some situations, an accurate set of matched-filter coefficients may be unavailable, for example due to the confidential or classified nature of such information. Therefore, in some embodiments, the coefficients of matched filter 3004 may be determined based on approximated characteristics of the predetermined signal, such as determining the coefficients based on an approximated structure of the predetermined signal.

In some embodiments, the spectrum sensor 2012 may detect the presence or absence of a plurality of predetermined signals. In these embodiments, the coefficients of the matched filter 3004 may be changed based on the predetermined signal being detected. For example, the spectrum sensor 2012 may include a memory containing multiple sets of matched filter coefficients, such that a different set of matched filter coefficients may be retrieved from the memory and applied to the baseband signal depending on the predetermined signal that the spectrum sensor 2012 is attempting to detect. More generally, the matched filter coefficients may be stored in any memory accessible to the processing circuitry used in the spectrum sensor 2012.

The matched filter 3004 is preferably applied in the frequency domain, and uses a set of coefficients corresponding to the matched filter's frequency response. For example, the spectrum sensor 2012 may transform a baseband signal corresponding to a received RF signal into the frequency domain, for example using a Fast Fourier Transform (FFT)

algorithm, to generate a set of frequency components of the baseband signal. The spectrum sensor may multiply the values of the frequency components of the baseband signal with a set of coefficients corresponding to the frequency response of the matched filter 3004 using, for example, an Overlap-Save method. In this method, the baseband signal's frequency components are divided into segments, each segment is multiplied by the matched-filter coefficients, and a portion of segment is temporarily stored so it may be reused in the multiplication operation performed for the next segment. Applying the matched filter 3004 in the frequency domain using the Overlap-Save method may have the benefit of significantly reducing the number of required multiplication operations compared with applying the matched filter 3004 in the time domain. In alternative embodiments, however, the matched filter 3004 may be applied to the baseband signal in the time domain. In such alternative embodiments, the baseband signal may be convolved with the impulse response of the matched filter 3004 using a set of time-domain matched filter coefficients. In the preferred embodiment, the spectrum sensor transforms the filtered signal back to the time domain, for example using an Inverse FFT (IFFT) algorithm.

The power-determining unit 3006 receives the matched filter output signal from the matched filter 3004. Because the baseband signal input to the matched filter was a complex signal, having I and Q components, the matched filter output signal is likewise a complex signal having I and Q components. The power-determining unit 3006 may determine a value indicative of the power of the filtered signal, for example, by summing the squares of each magnitude of the I and Q components. Alternatively, the power-determining unit 3006 may determine another value indicative of the power of the filtered signal, such as determining an amplitude of the complex matched filter output signal.

The comparator 3008 receives an output value from the power-determining unit 3006 and may compare the received value with a threshold value. The threshold value may be stored in the same memory, or in a different memory, as the matched-filter coefficients. Based on the result of the comparison, the spectrum sensor 2012 may determine the presence or absence of the predetermined signal being detected. For example, if the power level is greater than the threshold value, then the spectrum sensor may determine that the predetermined signal was present in the received RF signal. The comparator unit or another logic unit in the spectrum sensor 2012 may generate a signal or a value (such as a flag value) indicating the presence or absence of the predetermined signal. The comparator unit's output signal or value may be sent to the MAC processing unit 2006, causing the MAC processing unit to reconfigure one or more transmission parameters (or cause the MAC unit to cause another entity to reconfigure the transmission parameters) of a transmitter in the communication system 2000 based on whether the spectrum sensor detected the predetermined signal in the shared spectrum. Alternatively, the spectrum sensor 2012 itself may reconfigure a transmitter in the communication system 2000 based on the output signal or value from the comparator unit 3008.

The threshold value used by the comparator 3008 may be chosen to achieve a desired probability of false alarm ($P_{FA}$), for example, based on an acceptable range of detectable carrier-frequency offsets and/or acceptable SNR. In some embodiments, the threshold value may be determined from a calibration cycle of the spectrum sensor. For example, an additional logic unit (not shown in FIG. 3) in the spectrum sensor 2012 may be configured to select the threshold value after a calibration cycle, such as for example collecting a set of values generated by the power-determination unit 3006 during the calibration cycle (such as collecting values during a 10 second calibration period) and then selecting one of the collected values as the threshold value (such as selecting the tenth largest value collected during the calibration period).

Figure 4:
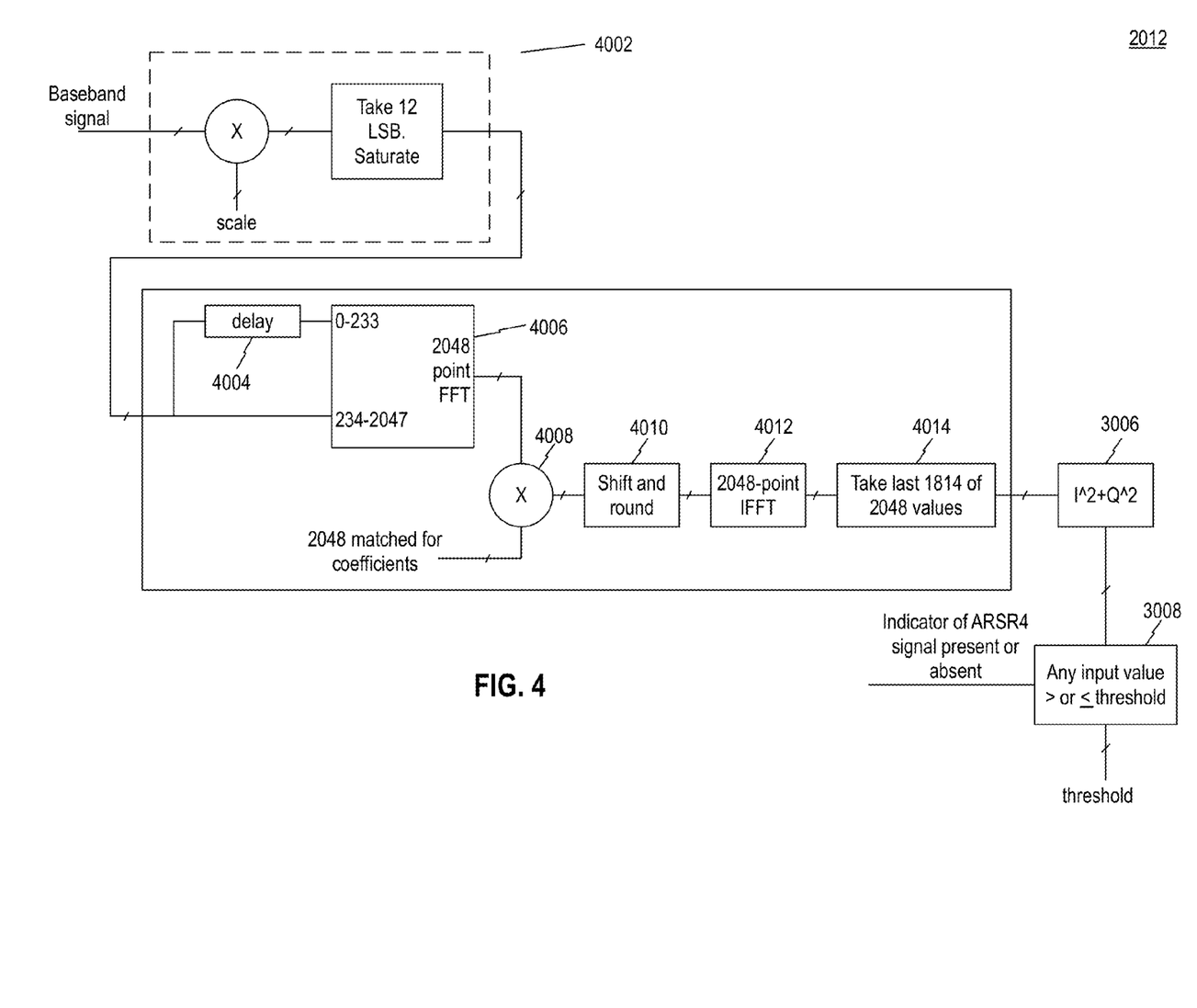
FIG. 4 is a schematic block diagram of an exemplary implementation of a spectrum sensor that may be used in accordance with the disclosed embodiments.

FIG. 4 illustrates a schematic block diagram of one exemplary implementation that may be used in the spectrum sensor 2012 in accordance with the disclosed embodiments. In this example, the spectrum sensor 2012 includes at least a scaling unit 4002, a delay unit 4004, an FFT block 4006, a multiplier unit 4008, a first shift and round unit 4010, an IFFT unit 4012, and a second shift and round unit 4014, power-determining unit 3006, and comparator unit 3008. Although the processing flow in FIG. 4 is shown using single lines, those of ordinary skill in the art will appreciate that the signals being processed are complex signals having I and Q components until the power-determining unit 3006 combines the I and Q components to determine a value indicative of the power, which is then compared to a threshold value in comparator unit 3008.

The scaling unit 4002 may multiply the digitized baseband signal (in the time domain) with a constant value. For example, each 12-bit segment of the baseband signal may be multiplied by a 5-bit unsigned constant value. In such an example, the resulting 17-bit output value may be converted back to a 12-bit value by selecting only its 12 least significant bits.

The output from the scaling unit 4002 may be connected to both the input of the delay unit 4004 and the input of FFT block 4006. For example, a first portion of the output signal from the scaling unit may be provided to the delay unit 4004, while the remaining portion of the scaling-unit output signal may be provided to the input of FFT block 4006. The delay unit 4004 stores the first portion of the scaled signal while the remaining portion of the signal is being processed by the FFT block 4006, and provides the stored portion of the signal to the FFT block when the next portion of the signal is to be processed. Therefore, the input of the FFT block 4006 receives a portion of the current signal as well as a portion of the previous signal in accordance with the overlap-save method described above.

In the example of FIG. 4, the FFT block 4006 generates the frequency components of the scaled baseband signal and provides those frequency components to the multiplier unit 4008. The multiplier unit may also receive frequency-domain coefficients for the matched filter 3004 (i.e., the frequency response of the matched filter). The output of the multiplier unit is a filtered signal in the frequency domain, which is input to the first shift and round unit 4010. The first shift and round unit 4010 may discard a portion of the filtered signal, for example, corresponding to overlapped data in the overlap-save method. By way of example, if 12-bit data segments output from the FFT block 4006 are multiplied by 9-bit matched-filter coefficients, the 21-bit results may be input to the first shift and round unit 4010, which restores the original 12-bit data lengths. The output from the first shift and round unit 4008 may be connected to the input of the IFFT block 4012. The IFFT block transforms the filtered signal back to the time domain and may further employ a second shift and round unit 4014 to select only certain least-significant bits generated by the IFFT block. Notably, a person of ordinary skill in the art will understand that at least some of the scaling, shifting, and rounding operations described relative to the exemplary embodiment shown in FIG. 4 may not be required depending on the precision of the circuitry in the spectrum sensor 2012.

The output from the second shift and round unit 4014 may be connected to an input of a power-determination unit 3006, described previously in connection with FIG. 3. In some embodiments, the power-determining unit may determine the magnitude of the I component of the filtered signal and the magnitude of Q component of the filtered signal, and calculate the sum of the squares of each magnitude. The power-determination unit 3006 outputs a value indicative of the power of the matched filter output signal, which is compared to a threshold value in the comparator unit 3008. If the comparator unit 3008 determines that the received power is greater than the threshold value, the spectrum sensor 2012 determines that the predetermined signal corresponding to the matched filter is present. The comparator unit or another logic unit in the spectrum sensor may generate a signal indicating the presence or absence of the predetermined signal in the shared spectrum.

Figure 5:
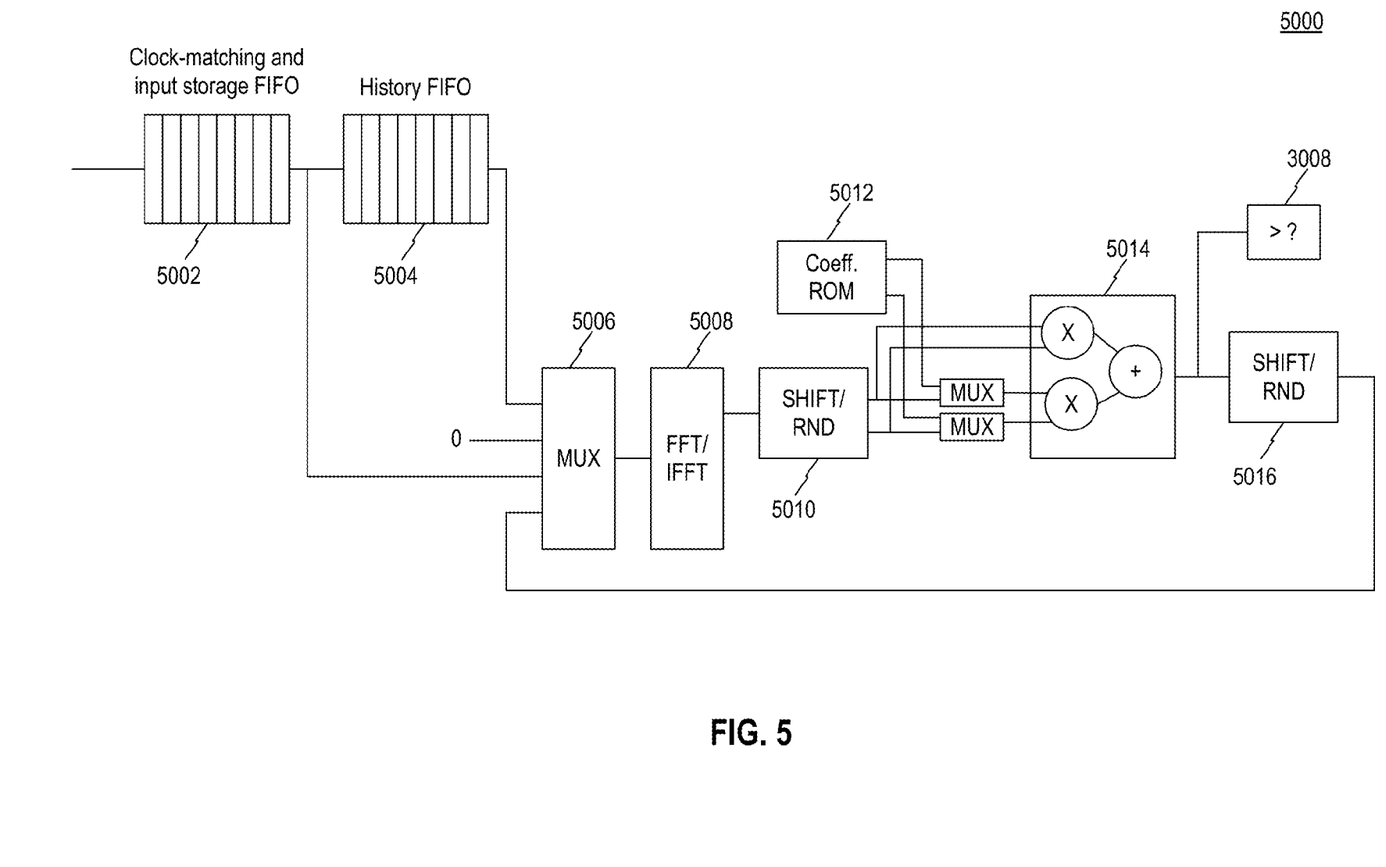
FIG. 5 is a schematic block diagram of another exemplary implementation of a spectrum sensor that may be used in accordance with the disclosed embodiments.

FIG. 5 illustrates another exemplary implementation of a spectrum sensor that may be used in accordance with the disclosed embodiments. In this example, the spectrum sensor 5000 includes at least an input storage first-in-first-out (FIFO) unit 5002, History FIFO unit 5004, multiplexor 5006, FFT/IFFT block 5008, first shift and round unit 5010, memory 5012 for storing one or more sets of matched-filter coefficients, complex multiplier 5014, second shift and round unit 5016, and comparator unit 5018.

The example shown in FIG. 5 may be useful in systems having limited processing resources since it uses a shared FFT/IFFT block and a complex multiplier that may be used in both the matched filter 3004 and power-determination unit 3006. For example, the use of FFT/IFFT block 5008 instead of FFT block 4006 and IFFT block 4012 may reduce the implementation size of spectrum sensor 5000 compared with the spectrum sensor in the example implementation shown in FIG. 4. Furthermore, the use of the complex multiplier 5014 instead of a multiplier 4008 and power-determination unit 3006 may further reduce the implementation size of spectrum sensor 5000 compared to the spectrum sensor of FIG. 4.

Inputs to the multiplexor 5006 include an output of the second shift and round unit 5016, a logical zero value, an output signal from the History FIFO unit 5004, and an output of input storage FIFO unit 5002. A select signal (not shown) may select one of the inputs to the multiplexor 5006. The FFT/IFFT block 5008 may be configured to be in a FFT mode or an IFFT mode. A first operand input of the complex multiplier 5014 may be connected to an output of the first shift and round unit 5010. A second operand input of the complex multiplier 5014 may be connected to either (i) the other output of the first shift and round unit 5010 when the complex multiplier 5014 is configured to calculate power of the filtered signal, or (ii) to a memory containing the matched-filter coefficients when the complex multiplier 5014 is configured to apply the matched filter in the frequency domain.

In FIG. 5, the input storage FIFO unit 5002 may be used to collect a sufficient amount of samples if a baseband signal (having I and Q components) to run a sensing cycle. In this context, a "sensing cycle" is defined as filtering a single segment of the baseband signal. During a sensing cycle, the input storage FIFO unit 5002 may serve as a buffer and collect additional baseband samples for use in the next sensing cycle. As such, the input storage FIFO 5002 may function as a clock-matching data buffer that accounts for different rates at which baseband samples may be input into the FIFO 5002 (e.g., from the RF front end) versus output from the FIFO 5002 (e.g., into the multiplexor 5006).

In one example, the first 234 baseband samples that are output from the input FIFO 5002 are collected in the History FIFO 5004, and the next 1814 samples are input to FFT/IFFT block 5008 in the FFT mode via the multiplexor 5006. The first 234 samples into the FFT/IFFT block 5008 are from the History FIFO unit, which are the first 234 samples collected from the prior sensing cycle. Zeros are used for the first FFT calculation. The complex multiplier 5014 multiplies the output of the FFT/IFFT block 5008 by the matched-filter coefficients retrieved from the memory 5012. The result of complex multiplier 5014 is forwarded to the second shift and round unit 5016, which discards a portion of the filtered result corresponding to the overlapping part of the input signal in accordance with an overlap-save method. The output of the second shift and round unit 5016 is provided to the FFT/IFFT block 5008 (now configured in the IFFT mode) to generate the matched filter output signal in the time domain.

The matched filter output signal is next provided to the complex multiplier 5014 (now configured to calculate the power of the filtered signal). The comparator unit 3008 compares the calculated power of the filtered signal received from the complex multiplier 5014 with a threshold value, for example, stored in a memory in the spectrum sensor. For example, the threshold value may be retrieved from a second memory unit (not shown in FIG. 5) or from the memory 5012. If the calculated power is determined to exceed the threshold value, the comparator unit 3008 outputs a signal or a value indicating that the predetermined signal associated with the matched-filter coefficients has been detected. If the calculated power is less than or equal to the threshold value, the comparator unit 3008 outputs a signal or value indicating that the predetermined signal associated with the matched-filter coefficients is absent.

Figure 6:
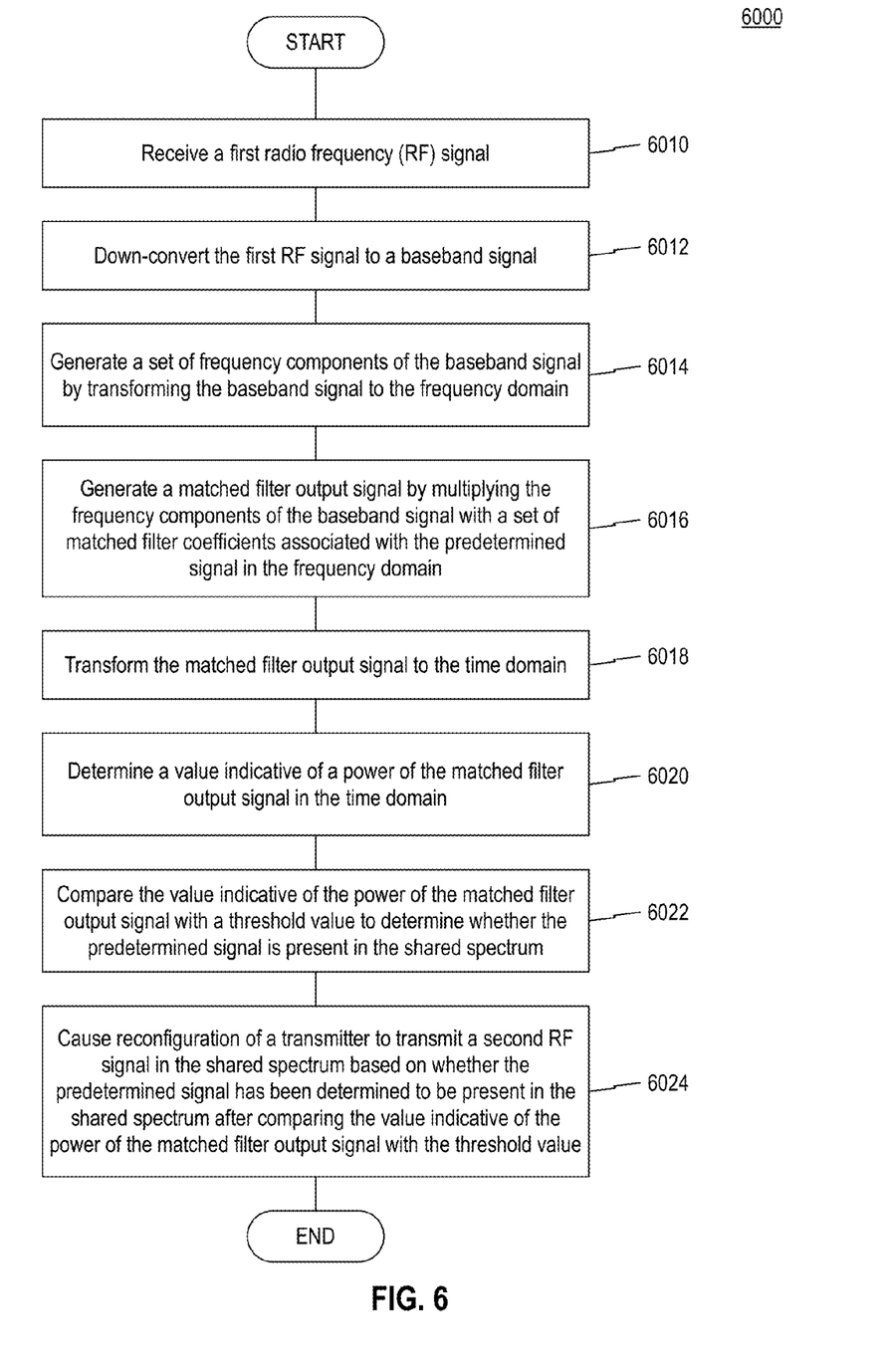
FIG. 6 is a flow chart illustrating an exemplary sequence of steps that may be performed for sensing the presence or absence of a predetermined signal in a shared spectrum in accordance with the disclosed embodiments.

FIG. 6 is a flow chart illustrating a sequence of steps for an exemplary method 6000 of sensing the presence or absence of a predetermined signal in a shared spectrum in accordance with the disclosed embodiments. The method 6000 may be performed by a spectrum sensor in a DSA system. In some embodiments, the shared spectrum may be the 3.5 GHz band, and in some embodiments the predetermined signal may be an ARSR-4 radar signal or a chirp signal within an ARSR-4 radar signal.

At step 6010, a first RF signal is received, for example, at the RF front end 2002. Next, at step 6012, the received RF signal is down-converted to a baseband signal, for example, using at least one local oscillator, mixer, and LPF and BPF filters in the RF front end 2002. At step 6014, a set of frequency components of the baseband signal is generated, for example using a FFT block 4006 or FFT/IFFT block 5008, by transforming the baseband signal into the frequency domain. At step 6016, a matched filter output signal is generated in the frequency domain by multiplying the frequency components of the baseband signal (generated at step 6014) with a set of matched filter coefficients associated with the predetermined signal, for example, using a multiplier unit 4008 or complex multiplier 5014. The matched filter output signal is transformed back to the time domain at step 6018, for example using IFFT block 4012 or FFT/IFFT block 5008. At step 6020, a value indicative of a power of the matched filter output signal in the time domain is determined, for example, using a power-determination unit 3006 or complex multiplier 5014. The method proceeds to step 6022 where a comparator unit may compare the value indicative of the power of the matched filter output signal (determined at step 6020) with a threshold value to determine whether the predetermined signal is present in the shared spectrum.

Finally, at step 6024 the result of the comparison from step 6022 may cause a reconfiguration of a transmitter to transmit a second RF signal in the shared spectrum based on whether the predetermined signal was determined to be present in the shared spectrum after comparing the value indicative of the power of the matched filter output signal with the threshold value. A signal or value generated by the comparator unit may cause the spectrum sensor, a MAC processing unit, and/or another entity in the communication system to determine a set of transmission parameters, such as for example carrier frequency, modulation, transmission power, transmission times, and/or transmission modes, and reconfigure the transmitter according to the determined set of transmission parameters.

In some embodiments, the step of reconfiguring the transmitter may further include reconfiguring the transmitter to transmit the second RF signal in at least one frequency channel other than a frequency channel of the predetermined signal when the predetermined signal is determined to be present. In some embodiments, the step of reconfiguring the transmitter may further include reconfiguring the transmitter to transmit the second RF signal without interfering with signals in a frequency of the predetermined signal when the predetermined signal is determined to be present. In some embodiments, the step of reconfiguring the transmitter may further include reconfiguring the transmitter to transmit the second RF signal in a frequency of the predetermined signal when the predetermined signal is determined not to be present.

The disclosed embodiments of the spectrum sensor described herein may use different sets of matched-filter coefficients for detecting RF signals having different signal characteristics. For example, the matched filter 3004 may use a first set of coefficients for filtering based on a first predetermined signal, such as a first complex linear chirp in a radar signal, and may use a second set of coefficients for filtering based on a second predetermined signal, such as a second complex linear chirp. Alternatively, the spectrum sensor may use a matched filter that has a set of matched-filter coefficients that have been configured based on multiple characteristics of a single predetermined signal, such as based on multiple complex linear chirps in a single ARSR-4 radar signal. In some situations, an accurate set of matched-filter coefficients may be unavailable, for example due to the confidential or classified nature of such information. Therefore, in some embodiments, the spectrum sensor may use a matched filter that has a set of matched-filter coefficients that have been determined based on an approximated structure of the predetermined signal. In some embodiments, the spectrum sensor may use multiple matched filters that operate sequentially, in parallel, or in any combination thereof. The spectrum sensor in the disclosed embodiments may be implemented in hardware, software, or any combination of hardware and software.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method of sensing the presence or absence of a predetermined signal in a shared spectrum, the method comprising:
   receiving a first radio frequency (RF) signal;
   down-converting the first RF signal to a baseband signal;
   generating a set of frequency components of the baseband signal by transforming the baseband signal to the frequency domain;
   generating a matched filter output signal by multiplying the frequency components of the baseband signal with a set of matched filter coefficients associated with the predetermined signal in the frequency domain;
   transforming the matched filter output signal to a time domain;
   determining a value indicative of a power of the matched filter output signal in the time domain;
   comparing the value indicative of the power of the matched filter output signal with a threshold value to determine whether the predetermined signal is present in the shared spectrum; and
   causing reconfiguration of a transmitter to transmit a second RF signal in the shared spectrum based on whether the predetermined signal is determined to be present in the shared spectrum after comparing the value indicative of the power of the matched filter output signal with the threshold value.

2. The method of claim 1, wherein each of the first RF signal, the baseband signal, and the matched filter output signal are complex signals having in-phase and quadrature components.

3. The method of claim 1, wherein the method is performed by a spectrum sensor in a dynamic spectrum access system.

4. The method of claim 1, wherein the shared spectrum is the 3.5 GHz band.

5. The method of claim 1, wherein the predetermined signal is a radar signal including one or more chirp signals.

6. The method of claim 1, further comprising determining the set of matched filter coefficients associated with the predetermined signal based on a known structure of the predetermined signal.

7. The method of claim 6, further comprising determining the set of matched filter coefficients associated with the predetermined signal to correspond to a chirp signal.

8. The method of claim 1, wherein the step of causing reconfiguration of the transmitter further comprises causing reconfiguration of the transmitter to transmit the second RF signal in at least one frequency channel other than a frequency channel of the predetermined signal when the predetermined signal is determined to be present.

9. The method of claim 1, wherein the step of causing reconfiguration of the transmitter further comprises causing reconfiguration of the transmitter to transmit the second RF signal without interfering with signals in a frequency channel of the predetermined signal when the predetermined signal is determined to be present.

10. The method of claim 1, wherein the step of causing reconfiguration of the transmitter further comprises causing reconfiguration of the transmitter to transmit the second RF signal in a frequency channel of the predetermined signal when the predetermined signal is determined not to be present.

11. The method of claim 1, further comprising determining the set of matched filter coefficients associated with the predetermined signal based on an approximated structure of the predetermined signal.

12. The method of claim 1, wherein the set of matched filter coefficients are associated with an approximated structure of the predetermined signal.

13. A spectrum sensor, comprising:
a receiver configured to receive at least a first RF signal in a shared spectrum;
a transmitter configured to transmit at least a second RF signal in the shared spectrum;
a memory configured to store at least one set of matched filter coefficients corresponding to a predetermined signal in the shared spectrum; and
a processor configured to:
down-convert the first RF signal to a baseband signal;
generate a set of frequency components of the baseband signal by transforming the baseband signal to the frequency domain;
generate a matched filter output signal by multiplying the frequency components of the baseband signal with a set of matched filter coefficients associated with the predetermined signal in the frequency domain;
transform the matched filter output signal to the time domain;
determine a value indicative of a power of the matched filter output signal in the time domain;
compare the value indicative of the power of the matched filter output signal with a threshold value to determine whether the predetermined signal is present in the shared spectrum; and
cause reconfiguration of the transmitter to transmit a second RF signal in the shared spectrum based on whether the predetermined signal is determined to be present in the shared spectrum after comparing the value indicative of the power of the matched filter output signal with the threshold value.

14. The spectrum sensor of claim 13, wherein the processor causes reconfiguration of the transmitter by causing reconfiguration of the transmitter to transmit the second RF signal in at least one frequency channel other than a frequency channel of the predetermined signal when the predetermined signal is determined to be present.

15. The spectrum sensor of claim 13, wherein the processor causes reconfiguration of the transmitter by causing reconfiguration of the transmitter to transmit the second RF signal without interfering with signals in a frequency channel of the predetermined signal when the predetermined signal is determined to be present.

16. The spectrum sensor of claim 13, wherein the processor causes reconfiguration of the transmitter by causing reconfiguration of the transmitter to transmit the second RF signal in a frequency channel of the predetermined signal when the predetermined signal is determined not to be present.

17. The spectrum sensor of claim 13, wherein the spectrum sensor is used in a dynamic spectrum access system.

18. The spectrum sensor of claim 13, wherein shared spectrum is the 3.5 GHz band.

19. An apparatus, comprising:
a RF front end comprising a receiver configured to receive a first RF signal in the shared spectrum and a transmitter configured to transmit a second RF signal in the shared spectrum; and
a spectrum sensor comprising:
a memory configured to store at least one set of matched filter coefficients corresponding to a predetermined signal in the shared spectrum; and
a processor configured to:
down-convert the first RF signal to a baseband signal;
generate a set of frequency components of the baseband signal by transforming the baseband signal to the frequency domain;
generate a matched filter output signal by multiplying the frequency components of the baseband signal with a set of matched filter coefficients associated with the predetermined signal in the frequency domain;
transform the matched filter output signal to a time domain;
determine a value indicative of a power of the matched filter output signal in the time domain;
compare the value indicative of the power of the matched filter output signal with a threshold value to determine whether the predetermined signal is present in the shared spectrum; and
cause reconfiguration of the transmitter to transmit a second RF signal in the shared spectrum based on whether the predetermined signal is determined to be present in the shared spectrum after comparing the value indicative of the power of the matched filter output signal with the threshold value.

20. The apparatus of claim 19, wherein the processor of the spectrum sensor causes reconfiguration of the transmitter by causing reconfiguration of the transmitter to transmit the second RF signal in at least one frequency channel other than a frequency channel of the predetermined signal when the predetermined signal is determined to be present.

21. The apparatus of claim 19, wherein the processor of the spectrum sensor causes reconfiguration of the transmitter by causing reconfiguration of the transmitter to transmit the second RF signal without interfering with signals in a frequency channel of the predetermined signal when the predetermined signal is determined to be present.

22. The apparatus of claim 19, wherein the processor of the spectrum sensor causes reconfiguration of the transmitter by causing reconfiguration of the transmitter to transmit the second RF signal in a frequency channel of the predetermined signal when the predetermined signal is determined not to be present.

23. The apparatus of claim 19, further comprising: a second processor configured to implement a MAC processing unit, the MAC processing unit configured to perform adaptive modulation and coding and scheduling.

24. The apparatus of claim 19, wherein the spectrum sensor is used in a dynamic spectrum access system.

25. The apparatus of claim 19, wherein shared spectrum is the 3.5 GHz band.

26. A spectrum sensor, comprising:
means for receiving a first RF signal;
means for down-converting the first RF signal to a baseband signal;
means for generating a set of frequency components of the baseband signal by transforming the baseband signal to the frequency domain;

means for generating a matched filter output signal by multiplying the frequency components of the baseband signal with a set of matched filter coefficients associated with the predetermined signal in the frequency domain;

means for transforming the matched filter output signal to a time domain;

means for determining a value indicative of a power of the matched filter output signal in the time domain;

means for comparing the value indicative of the power of the matched filter output signal with a threshold value to determine whether the predetermined signal is present in the shared spectrum; and means for causing reconfiguration of a transmitter to transmit a second RF signal in the shared spectrum based on whether the predetermined signal is determined to be present in the shared spectrum after comparing the value indicative of the power of the matched filter output signal with the threshold value.

* * * * *